United States Patent [19]
Gerhard et al.

[11] 3,795,093
[45] Mar. 5, 1974

[54] APPARATUS FOR CLEANING THE AIR FROM A SPRAY PAINTING CHAMBER

[75] Inventors: Rainer Gerhard, Stiegefled, Germany; Sture Axberg, Vaxjo, Sweden

[73] Assignee: Aktiebolaget Svenska Flaktfabriken, Nacka, Sweden

[22] Filed: Apr. 27, 1972

[21] Appl. No.: 237,272

[52] U.S. Cl. .............. 55/238, 55/240, 98/115 SB, 261/DIG. 54, 261/112
[51] Int. Cl. .......................................... B01d 47/10
[58] Field of Search...... 55/238, 240, 241; 261/54, 112; 98/115 SB

[56] References Cited
UNITED STATES PATENTS

| | | |
|---|---|---|
| 968,332 | 8/1910 | Dow .............................. 261/DIG. 54 |
| 2,267,426 | 12/1941 | Saunders et al. ............ 261/DIG. 54 |
| 2,719,705 | 10/1955 | Watson ................................ 55/241 |
| 3,138,087 | 6/1964 | Larsson et al. ...................... 261/112 |
| 3,138,442 | 6/1964 | Krantz ..................................... 55/240 |
| 3,168,030 | 2/1965 | Wilhelmsson et al. ............... 261/112 |
| 3,168,031 | 2/1965 | Wilhelmsson et al. ........ 261/DIG. 54 |
| 3,216,183 | 11/1965 | Larsson .............................. 55/35 X |

Primary Examiner—Bernard Nozick
Attorney, Agent, or Firm—Howson and Howson; Henry H. Skillman

[57] ABSTRACT

A method and arrangement for cleaning wetted air from spray painting chambers equipped with venturi, discharge opening by deflecting softly laterally mixture of air and water for separating by centrifugal force action enclosed particles and then causing flow of mixture to pass laminar for preventing new mixture.

3 Claims, 1 Drawing Figure

PATENTED MAR 5 1974          3,795,093
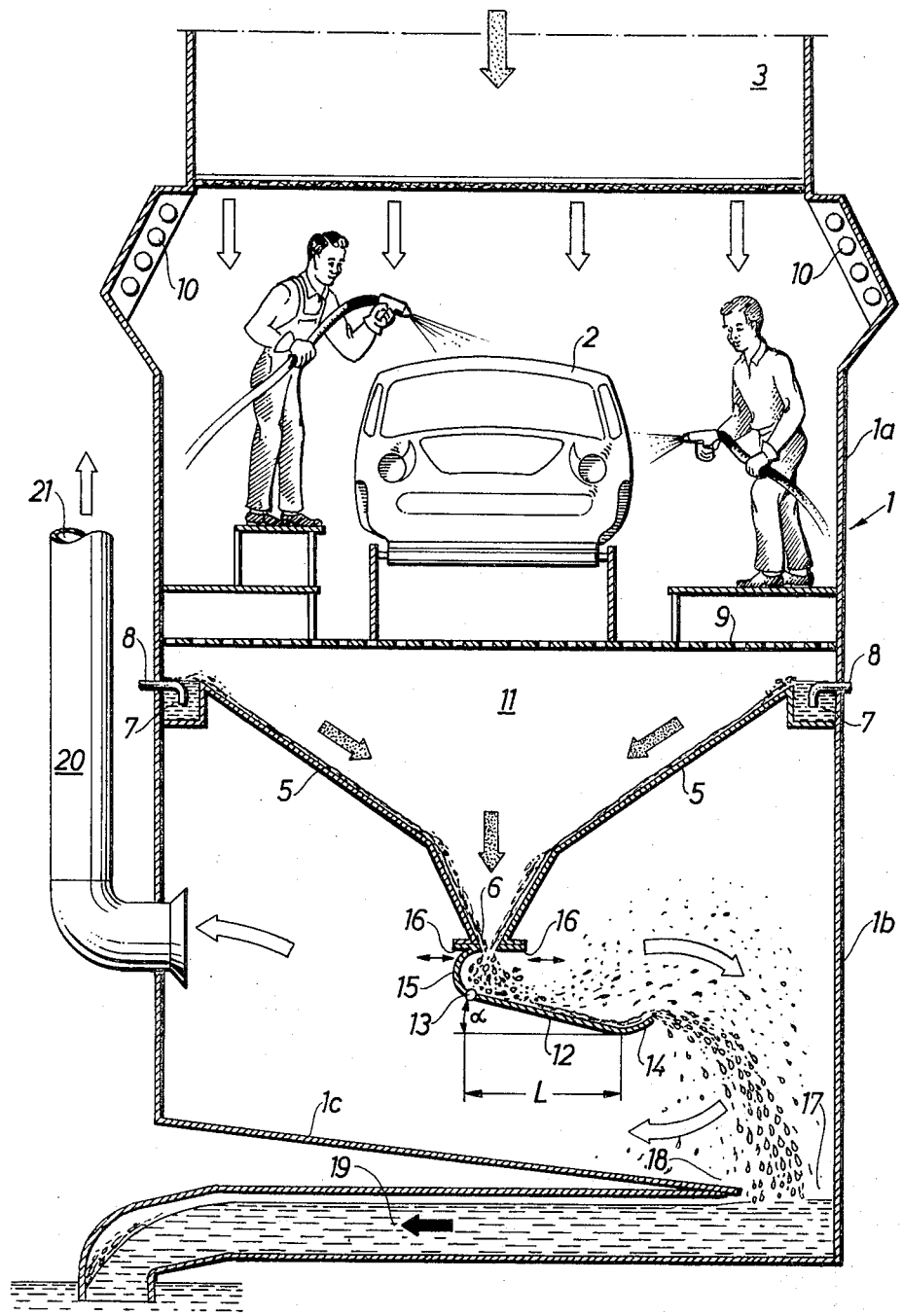

APPARATUS FOR CLEANING THE AIR FROM A SPRAY PAINTING CHAMBER

This invention relates to cleaning the air from a spray painting chamber for objects continuously or intermittently advanced therethrough, in which the evacuated air is washed with a washing liquid dissolving the paint particles, with which liquid whilst it is atomized with turbulence the air is mixed intensively in a Venturi device disposed beneath the chamber floor to eliminate by agglomeration in the liquid the adhesion tendency of the paint particles following along with the air.

The invention further relates to apparatus adapted for carrying out the cleaning.

One important application field for the invention is in spray painting chambers for motor-car bodies. It was found, that at manual spray painting in such chambers only 50 percent of the atomized paint adheres to the bodies. The remaining paint forms a mist consisting of small paint droplets, which is to be removed instantaneously. In modern plants this is effected by very forceful evacuation through the floor of the spray painting chambers which usually are constructed of floor gratings. It has for a long time been a serious problem to separate the sticky paint droplets from the evacuation air of the spray painting chamber, because the paint when it is not separated gives rise to great inconveniencies in the surrounding areas of the plant, in the form of dust deposits on buildings, on completed cars parked, etc. It further was found that heavy paint deposits constitute a considerable fire risk. The spray painting plant, therefore, must have a high separation capacity and, besides, be constructed so that it reduces the clogging risk, because otherwise the operation has to be stopped from time to time for a both expensive and tedious cleaning of the plant.

The present invention relates to a novel and improved apparatus for cleaning the air from spray painting chambers, which meets very high requirements. The apparatus according to the invention is characterized in that the air-liquid mixture subsequent to its passage through the Venturi device is deflected softly by a guide member laterally from its flow direction to separate by action of the centrifugal force the air and liquid particles and to make the flow of said mixture substantially laminar to prevent a new mixing of said particles. An expedient further development of this apparatus is characterized in that air particles separated off by the deflection, subsequent to their passage along said guide member, are passed through a curtain of the coherent liquid film also separated from the air-liquid mixture. In this way, the air by simple means is subjected to an additional washing. An advantageous arrangement for carrying out the aforesaid apparatus is characterized in that a guide member is mounted immediately after said Venturi device, and that the guide member comprises a substantially arc-shaped portion located first in the flow direction of the air-liquid mixture followed by a plane surface inclined at a definite angle to the horizontal plane. According to a preferred embodiment, the guide member is terminated by an upright edge adapted to force the liquid curtain flowing off from the plane portion of the guide member obliquely upwardly to a greater fall height and thereby to enlarge the contact surface between the coherent liquid curtain and the separated air.

The invention is described in greater detail in the following, with reference to the accompanying drawing showing by way of example an embodiment of apparatus for carrying out the cleaning according to the invention.

In the Figure, 1 designates a closed spray painting chamber, through which the objects 2 to be spray painted are advanced. The chamber is supplied from means (not shown) with heated, possibly filtered ventilation air through a passageway 3. An air filter extends across the entire horizontal cross-section of the chamber and facilitating the uniform distribution of the ventilation air across said entire cross-section. An air filter of said kind may be divided into sections, which are replaced in turn as they are dirtied by the entering ventilation air, or the filter may be designed as a filter mat adapted to be reeled up successively or in steps. 5 designates a V-shaped bottom portion located beneath the floor grating 9 of the chamber. 6 designates a longitudinal slit in the bottom portion for removal of the aforesaid polluted ventilation air. 7 designates containers for washing liquid, and 8 designates liquid supply lines, through which washing liquid is supplied in such a way, that the V-shaped bottom portion permanently is flush-covered with liquid to prevent paint deposits thereon. The space beneath the floor grating is designated by 11. 16 designates a preferably adjustable throttling flange disposed directly beneath the slit 6, which acts as a Venturi device, and 12 designates a guide plate located beneath said slit and said throttling flang 16, which plate terminates at one end into an upright edge 14 and is connected at the other end with said slit 6 by an arc-shaped portion 15. The inclination of the plate 12 is designated by the angle $\alpha$, and its length by L, and the curvature of the. The arc-shaped portion is rigidly connected with said bottom plate 12 in the point 13. In the embodiment shown, the bottom 1c of the spray painting chamber inclines downwardly to the right-hand side where a basin 17 is provided to collect used washing liquid. A valve (not shown) may be provided in the bottom of the basin 18 lifted and lowered for discharging part of the basin water through the line 19. 20 and 21 designate an evacuation means for removal of the ventilation air free from paint particles into the open air. The arrangement, therefore, comprises an evacuating fan (not shown).

The ventilation air sweeps the entire cross-section of the spray painting chamber uniformly, as indicated by arrows, and is thereby mixed with air-born paint particles. In manual spray painting, as already mentioned, only 50 percent of the atomized paint can be expected to adhere to the bodies. The remaining part forms a paint mist, which instantaneously is to be removed both in view of the health of the staff and of the quality of the already painted bodies. Therefore, a very forceful evacuation of large air amounts is to be effected across the entire floor surface of the spray painting chamber, i.e. the floor gratings 9. The ventilation air mixed with paint particles and evacuated from the upper part 1a of the spray painting chamber impacts on the inclined liquid-flushed surfaces of the V-shaped bottom portion. The liquid supplied by overflow from the containers 7 includes additions of chemicals such that the free paint particles cannot adhere to the sheet metal surfaces in the lower part 16 of the chamber 1. The evacuated paint is "killed" at an early stage when it is being passed with high speed through the liquid zone in the slit 6 comprising the preferably adjustable throttling flange 16, where the water is disintegrated to a homogenous mist. An intimate mixture of stale ventilation air and said paint mist is directed by the arc-shaped portion 15 outwardly over the inclined plate 12. It was found that the aforedescribed arrangement renders a separation degree exceeding 99.8 percent. The reason for this can be assumed to be the double deflection and cleaning effect to which the mixture is subjected, i.e. subsequent to its passage through the flange 16 at the arc-shaped portion 15 and by the obliquely upwardly directed edge 14 of the inclined plate 12. The stale ventilation air finally is cleaned by the liquid curtain of dropping droplets formed between the details 14 and 17.

It was found possible in practice, in the arrangement described to omit such drop catching surfaces, for example evolutors, which are considered necessary in the air evacuation shaft (shafts) of conventional embodiments. This implies substantial savings both with respect to space requirement and installation costs. A further important advantage of the method and arrangement according to the invention is the easiness of cleaning the details 16, 15 and 12 which can be carried out at relatively long intervals of the magnitude once in 6 months.

The arrangement for carrying out the method can be modified in several ways within the scope of the following claims.

We claim:

1. Apparatus for cleaning air from a spray painting chamber comprising downwardly converging bottom walls below said spray chamber terminating in a single elongated slit extending the entire length of said chamber, a lower chamber below said bottom walls sealingly surrounding said slit and in communication therewith, an air outlet from said lower chamber having means to exhaust air therefrom and to cause air having entrained paint particles therein to flow downwardly from the spray chamber through said single elongated slit, and means to direct washing liquid downwardly along said walls to avoid adherence of paint particles thereon, said washing liquid entering into the air flow in said slit, a plane guide surface mounted in said lower chamber underlying the entire length of said slit and declining laterally downwardly therefrom at a predetermined angle to the horizontal, the upper end of said surface being directly below said slit and connected to said slit by an arcuate wall portion projecting laterally in the opposite direction from said downwardly declining surface whereby said arcuate wall effects centrifugal separation of the paint and washing liquid from the air flow and said arcuate wall and surface softly deflect the flow laterally along said surface with laminar flow, and means at the bottom of said lower chamber spaced below the lower end of said guide surface to collect and discharge the liquid flowing down and discharged from the declining surface.

2. Apparatus according to claim 1 including means to withdraw the air from the opposite side of said arcuate wall portion and guide surface whereby the air is caused to flow transversely through the liquid passing from the lower end of said guide surface into the collection means, to thereby effect an additional washing of the air.

3. Apparatus according to claim 1 including an upwardly directed terminal portion at the lower end of said guide surface to thereby generate an arcuate liquid curtain flowing from said guide surface into said collection means.

* * * * *

UNITED STATES PATENT OFFICE
CERTIFICATE OF CORRECTION

Patent No. 3,795,093          Dated March 5, 1974

Inventor(s) Rainer Gebhard and Sture Axberg

It is certified that error appears in the above-identified patent and that said Letters Patent are hereby corrected as shown below:

In the listing of the inventors in the heading, the correct spelling of the first inventor should be --Rainer Gebhard--.

Column 2, line 30, "flang" should be --flange--;

Column 2, line 41 should read as follows: --tom of the basin at 18 for discharging--.

Signed and sealed this 18th day of June 1974.

(SEAL)
Attest:

EDWARD M. FLETCHER, JR.
Attesting Officer

C. MARSHALL DANN
Commissioner of Patents